US012806097B2

United States Patent
Higgins

(12) United States Patent
(10) Patent No.: US 12,806,097 B2
(45) Date of Patent: Nov. 24, 2026

(54) FLOCKED ALTERNATING PRESSURE PAD SYSTEM AND METHOD FOR BEDSORE PREVENTION

(71) Applicant: Cross Innovations LLC, Cheyenne, WY (US)

(72) Inventor: Shawn P. Higgins, Cheyenne, WY (US)

(73) Assignee: Cross Innovations LLC, Cheyenne, WY (US)

( * ) Notice: Subject to any disclaimer, the term of this patent is extended or adjusted under 35 U.S.C. 154(b) by 216 days.

(21) Appl. No.: 18/521,516

(22) Filed: Nov. 28, 2023

(65) Prior Publication Data

US 2025/0099314 A1 Mar. 27, 2025

(30) Foreign Application Priority Data

Sep. 21, 2023 (CN) ........................ 202322577987.0

(51) Int. Cl.
*A61G 7/057* (2006.01)
*A47C 27/10* (2006.01)

(52) U.S. Cl.
CPC .......... *A61G 7/05776* (2013.01); *A47C 27/10* (2013.01)

(58) Field of Classification Search
CPC ............ A61G 7/05776; A61G 7/05769; A61G 13/1265; A47C 27/10; A47C 27/081; A47C 27/082
USPC .......................... 5/713, 655.3, 690, 709, 712
See application file for complete search history.

(56) References Cited

U.S. PATENT DOCUMENTS 3,287,749 A 11/1966 Marsico
3,297,023 A 1/1967 Foley
3,674,019 A 7/1972 Grant
4,972,534 A 11/1990 Hutton
D314,805 S 2/1991 Thomas
D315,188 S 3/1991 Thomas
D315,189 S 3/1991 Thomas
D315,774 S 3/1991 Thomas
5,103,518 A 4/1992 Gilroy et al.
D341,983 S 12/1993 Wang
D356,918 S 4/1995 Marshburn
(Continued)

FOREIGN PATENT DOCUMENTS

CN 220966921 U 5/2024
EA 015759890001 10/2024
GB 6399679 10/2024

OTHER PUBLICATIONS https://www.amazon.com/Lunderg-Alternating-Air-Pressure-Replacement/dp/B0C3W5Z5ZS/ref=sr_1_5?crid=35TEZBXHKCO90&dib=eyJ2ljoiMSJ9.8Q9M12hxdDtyg9AH4uqnK1EzmZIU048ua3zkoXLmMV6la3nVHw9-kvokF7Fmo5ChdK_xuJreA89J4RLN5v0F3H90pTzjhhqBsOtySPnUwxwnTZ9sU47AEz2vfEhfHP6alTXfLngmqQSr2XvHn4bWiLkSyR1vFfFRA-PvOgdc-g3iz (Year: 2023).*
(Continued)

*Primary Examiner* — Justin C Mikowski
*Assistant Examiner* — Deborah Talitha Gedeon
(74) *Attorney, Agent, or Firm* — Davis Wright Tremaine LLP

(57) ABSTRACT

An alternating pressure pad system that includes an alternating pressure pad. The alternating pressure pad includes a first layer defined by a planer sheet of flocked polyvinyl chloride (PVC), the first layer having a thickness of between 0.50 mm-0.70 mm and comprising a PVC portion and a flocked portion coupled to a face of the PVC portion, the PVC portion having a thickness of between 0.3 mm and 0.5 mm and the flocked portion having a thickness between 0.15 mm and 0.25 mm.

18 Claims, 6 Drawing Sheets

(56) References Cited

U.S. PATENT DOCUMENTS

| | | | | |
|---|---|---|---|---|
| 5,437,068 | A | 8/1995 | Fisher | |
| 5,901,393 | A | 5/1999 | Pepe et al. | |
| D414,365 | S | 9/1999 | Hsu et al. | |
| D486,343 | S | 2/2004 | Feuer | |
| D490,635 | S | 6/2004 | Boso et al. | |
| D537,287 | S | 2/2007 | Lau | |
| 8,791,321 | B2 | 7/2014 | Love et al. | |
| 9,724,256 | B2 | 8/2017 | Love et al. | |
| 9,808,387 | B2 | 11/2017 | Love et al. | |
| D898,458 | S | 10/2020 | Huang | |
| 11,090,210 | B2 | 8/2021 | Love et al. | |
| 12,042,051 | B1 | 7/2024 | Kalies | |
| D1,047,523 | S | 10/2024 | Shi | |
| 2003/0163874 | A1* | 9/2003 | Boso | A47C 27/10 5/713 |
| 2005/0022307 | A1 | 2/2005 | McClintock et al. | |
| 2005/0246834 | A1 | 11/2005 | Weedling et al. | |
| 2007/0000050 | A1 | 1/2007 | Wu | |
| 2008/0178392 | A1* | 7/2008 | Chu | A61G 7/05776 5/713 |
| 2010/0139003 | A1* | 6/2010 | Moutafis | A47C 27/081 5/655.3 |
| 2014/0115790 | A1 | 5/2014 | Romano et al. | |
| 2016/0279005 | A1 | 9/2016 | Crewdson | |
| 2017/0332802 | A1 | 11/2017 | Stern | |
| 2019/0380504 | A1 | 12/2019 | Therkildsen et al. | |
| 2021/0030165 | A1 | 2/2021 | Chen | |
| 2021/0068556 | A1* | 3/2021 | Langer | A61G 7/07 |
| 2022/0211564 | A1 | 7/2022 | Love et al. | |
| 2025/0099314 | A1 | 3/2025 | Higgins | |
| 2025/0107630 | A1 | 4/2025 | Higgins | |

OTHER PUBLICATIONS

Amazon.com, "Lunderg Alternating Air Pressure Mattess Pad—with Flock-Tech & Static Mode—Bed Sore Prevention—Includes Multi-Layer Hospital Bed Mattress Topper Pressure Ulcer Cushion Pad & Improved Quiet Pump," Retrieved on Jan. 19, 2024 from https://www.amazon.com/Lunderg-Alternating-Pressure-System-Full/dp/B0BNVJQ111, 11 pages.

Lundberg, "Alternating Air Pressure Mattress Pad With Pump—With Flock-Tech & Static Mode," Retreived on Jan. 19, 2024 from https://lunderg.com/alternating-pressure-pad/ , 5 pages.

Cross Innovations LLC, "A Multi-Cavity Air Mattress," China IPO Application No. 2023225779870 filed Sep. 21, 2023.

Canadian Intellectual Property Office Examination Report dated Jul. 30, 2025; Application No. 234250, 1 page.

European Union Intellectual Property Office Certificate of Registration No. 015075989-0001, Registered Oct. 14, 2024, 4 pages.

United Kingdom Intellectual Property Office Examination Report dated Oct. 29, 2024, Design Application No. 6399679, 2 pages.

USPTO Final Office Action dated Aug. 24, 2026, U.S. Appl. No. 19/322,460, 17 pages.

USPTO Non-Final Office Action dated Jul. 2, 2026, U.S. Appl. No. 18/980,421, 28 pages.

* cited by examiner

FLOCKED ALTERNATING PRESSURE PAD SYSTEM AND METHOD FOR BEDSORE PREVENTION

CROSS-REFERENCE TO RELATED APPLICATIONS

This application claims the priority to Chinese Patent Application No. 202322577987.0, filed Sep. 21, 2023, entitled "A multi chamber inflatable mattress." This application is hereby incorporated herein by reference in its entirety and for all purposes.

Figure 1:
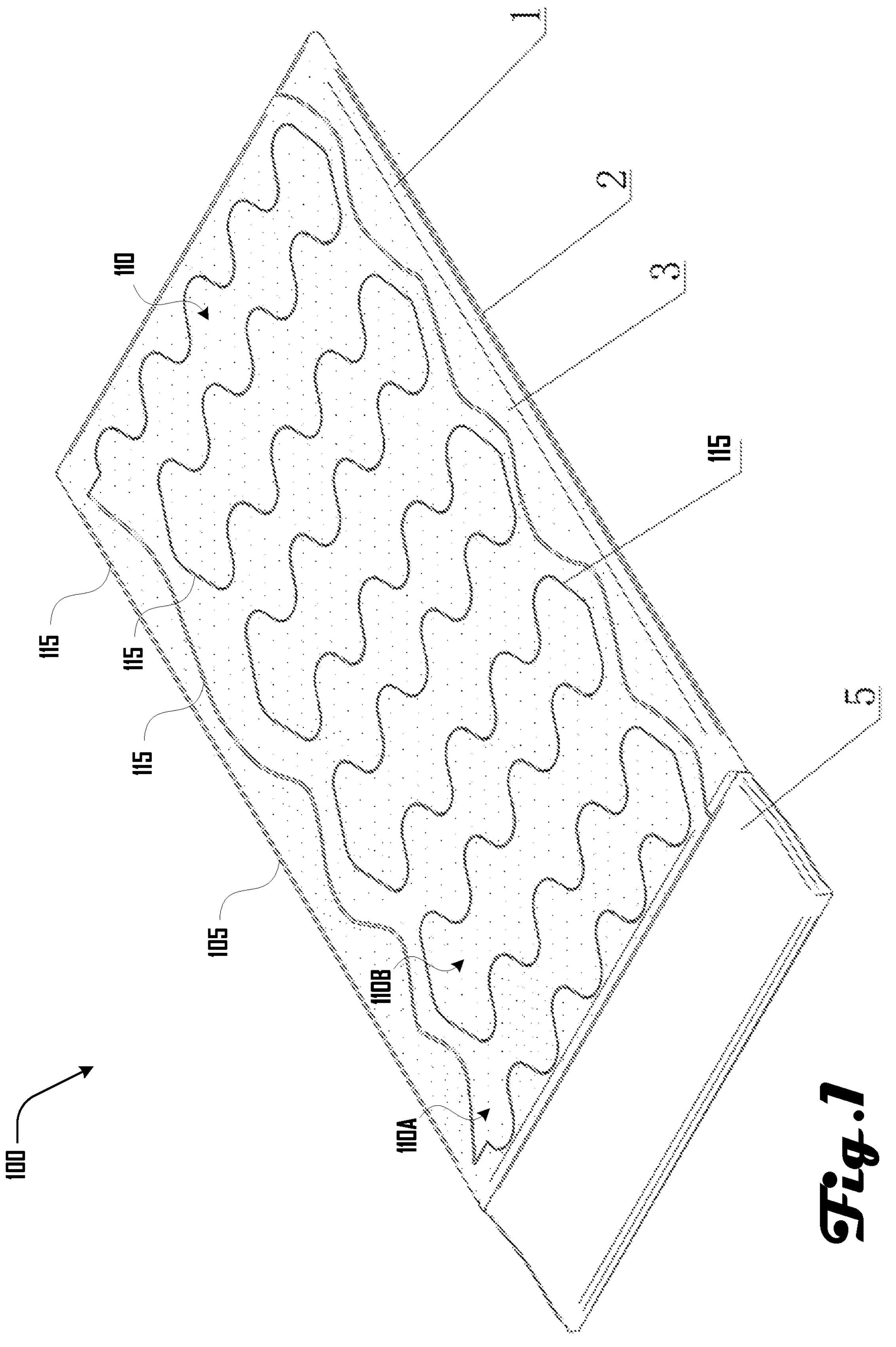
FIG. 1 is an example perspective view illustrating an embodiment of alternating pressure pad.
Figure 2:
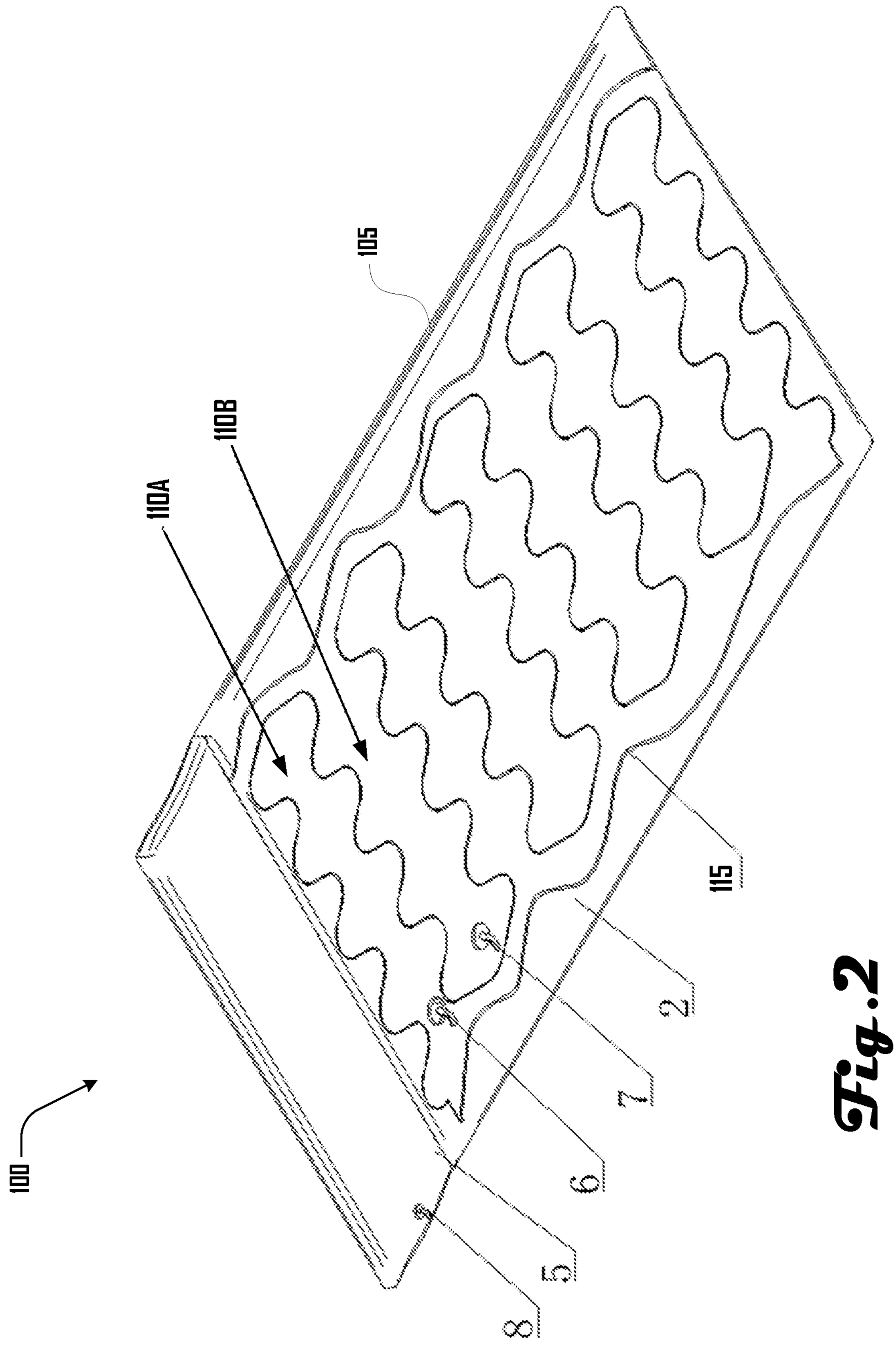
FIG. 2 is another example perspective view illustrating an embodiment of alternating pressure pad.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Inflatable pads can have strong flexibility and elasticity, and after inflation, their expansion volume increases. Inflatable pads can include advantages such as non-deformability, comfortable body feel, and easy portability. Some inflatable pads can be used for family and travel, and in some examples, only have one inflatable chamber and the mattress can be inflated through one inflation port. Such a structure can be designed to be convenient to carry.

Some inflatable pads used in medical care can divide the mattress into two compartments: front and rear. By filling and releasing gas from the compartments, the patient can be raised in the upper part of the body and lowered in the lower part of the body, and vice versa, which can facilitate the patient's sitting posture and can facilitate care. Another type of inflatable pad can include two inflatable chambers on the left and right sides of the pad, which can be filled with gas to achieve left high, right low, or right high, left low for patients to roll over in some examples.

For patients who have been bedridden for a long time, an inflatable pad can leak, and the pad can collapse. For patients with bedsores or prone to bedsores, when an inflatable pad collapses, patients can touch the bed board, causing damage to patient's existing bedsores and/or causing bedsores to form.

For patients with bedsores or prone to bedsores, in various embodiments it can be desirable to provide an alternating pressure pad system that provides varying contact with body of the patient while also providing a stable bed for the patient. Additionally, it can be desirable to provide a pad that provides characteristics such as a high-friction top surface that prevents slipping and sliding of the patient on the top of the pad while also providing a surface that is comfortable to the touch and reduces excess moisture by managing the heat and humidity of the skin of the patient. Additionally, given that bedridden patients may rest on an inflatable pad for long periods of time (e.g., days, weeks, months or years), it can be desirable to provide a pad that is durable and configured for constant use, including constant inflation and deflation and constant pressure of the patient on the pad. An alternating pressure pad as discussed herein can provide relief and comfort to patients by providing alternating pressure on skin surfaces and bony prominences. The slow inflation and deflation in some embodiments can increase circulation and reduce the need of exhausting, yet otherwise necessary, constant turning or moving of the patient to prevent discomfort, bedsores, blood clots, and the like.

Various embodiments disclosed herein provide a flocked multi chamber alternating pressure pad that comprises a first layer and a second layer. In some embodiments, the first layer is a flocked PVC (Polyvinyl Chloride) sheet ranging from 0.50 mm-0.70 mm in thickness that is welded to the second layer, which is a PVC sheet ranging from 0.29-0.40 mm in thickness.

In some embodiments, the multi chamber inflatable pad includes a lining layer arranged at the edge of the first layer, wherein the contour of the lining layer complements the contours of the first and second chambers to provide an overall rectangular pad. For example, such a pad can be generally rectangularity-sized for a single human adult or child user, for a twin bed, for a queen-sized bed, for a king-sized bed, and the like. In some embodiments, the lining layer can comprise, consist essentially of or consist of a flocking layer. Flocking technology in various embodiments can integrate various velvet materials onto one or more layers of PVC material and can be beneficial to the user experience.

Flocking on PVC sheets can include a manufacturing process for achieving a textured or velvety surface finish on a PVC sheet. Flocking can be desirable in various applications where a soft feel, enhanced aesthetic appearance, or improved grip is desired. In an example, a manufacturing process begins with the preparation of a PVC substrate such as a sheet of PVC, which can be cleaned and pre-treated to ensure optimal adhesion of the flocking material. An adhesive (e.g., in liquid form) can be uniformly applied to a face of the PVC sheet. The choice of adhesive in some examples can depend on factors such as the type of flocking material being used and the desired properties of the final flocked product. A flocking material in various examples can be composed of tiny fibers (flock).

In some embodiments, such flocking fibers or flock can include microfibers, with diameters typically between 0.5 and 2 deniers (a "denier" is a unit of measurement used to quantify the thickness of threads and fibers in textiles; it is defined as the mass in grams per 9000 meters of the fiber. In other words, if a 9000-meter length of a specific fiber weighs 1 gram, that fiber is 1 denier).

In some embodiments, such flocking fibers or flock can include microfibers having a length of less than or equal to 0.25 mm, 0.5 mm, 0.75 mm, 1 mm, 1.5 mm, 2.0 mm, 2.5 mm, 3 mm, 4 mm, 5 mm, 6 mm, 7 mm, 8 mm, 9 mm, 10 mm, or the like, or a range between such example values.

In some embodiments, flocking fibers, can be characterized by deniers from 1 to 10 and lengths spanning 0.5 to 5 millimeters. In further embodiments, flocking fibers, can be characterized by being within the 10 to 40 denier range and lengths of 1 to 5 millimeters. In various embodiments, flocking fibers can be cylindrical or other suitable shape.

During manufacturing of a flocked sheet of PVC, the flocking material can be electrostatically charged, which in various examples can provide for the flocking material to adhere vertically to the adhesive-coated PVC surface, creating a directional orientation. The application of the charged flock can allow for control over the flock's alignment and density.

Once the electrostatically charged flocking materials can be applied to the adhesive-coated PVC sheet, the adhesive can be cured or dried, which can permanently affix the flock to the PVC surface. This can generate a durable and long-lasting flocking finish in various embodiments. Depending on the desired outcome, in some examples additional processes may be employed to align the flock in one or more specific directions, creating patterns or textures that enhance both the visual and tactile aspects of the flocked PVC sheet.

Throughout the manufacturing process, in various embodiments quality control measures can be implemented to ensure uniform flock distribution, optimal adhesion strength, and overall product consistency. The flocking process can provide customization options in some examples, including varying flock lengths, color choices, and the creation of intricate patterns, providing flexibility in design.

In various embodiments, resulting flocked or velvety surface not only enhances the aesthetic appeal of the PVC sheet but also adds a tactile dimension, making it suitable for applications where grip, touch, temperature control and humidity control are desirable. In various examples, a flocking manufacturing process can generate a finished product that withstands wear and tear, making it suitable for a wide range of applications including one or more embodiments discussed herein.

While examples of PVC sheets are discussed herein in various examples, in some embodiments any suitable material can be flocked and used to generate various embodiments. For example, such materials can include Thermoplastic Polyurethane (TPU), Ethylene-vinyl Acetate (EVA), Polyethylene (PE), rubber, and the like.

In some embodiments, a multi chamber inflatable pad further includes an extension portion connected to the ends of the first and second layers. The extension part can increase the coverage area of the inflatable pad and facilitate its fixation (e.g., it can be clamped or pressed tightly with the bed body through the extension block). In some embodiments, the extension portion is expandable and has a third inflation port. In some embodiments, the extension portion is a solid component, allowing for direct use. In some embodiments, the contour between the first bifurcation and the adjacent second bifurcation is linear, such as having a stepped cross-sectional contour. In some embodiments, the contour between the first bifurcation and the adjacent second bifurcation is curved, such as having a wavy cross-sectional contour.

Various embodiments of an alternating pressure pad can achieve different air pressures in different chambers by generating multiple chambers in a pad and configuring separate inflation ports in each chamber that can allow for the separate chambers to be selectively inflated and deflated separately to provide alternating pressure in the separate chambers in some examples. For example, different air pressures in the two chambers can cause the height of the upper surface of the two chambers to raise and lower separately, allowing for alternating or changing location of the upper surface of the alternating pressure pad that contacts the body of the user, which in various examples can avoid long-term contact of the alternating pressure pad in the same body area. In various embodiments, this can be desirable for the rehabilitation of patients with bedsores, to prevent bedsores from forming, or to increase patient comfort. As discussed herein, various embodiments include a flocking layer, which can make the alternating pressure pad more comfortable and softer for the patient.

Various embodiments include staggered chambers through separated parts of the alternating pressure pad, each of which chambers can provide support for the patient's body. A first and second chamber can be separate such that if one chamber leaks, the other chamber will not collapse or leak, and the support for the patient can remain effective, avoiding contact between the patient's bedsore position and a bed board or other surface that the alternating pressure pad is disposed on.

Turning to FIGS. 1-5, example embodiments of an alternating pressure pad 100 are illustrated. In this example, the alternating pressure pad 100 comprises a pad body 105 that defines a first and second inflatable chamber 110A, 110B. The pad body 105 can comprise a first layer 1 and a second layer 2 that are defined by respective sheets of material (e.g., sheets of PVC material). Edge and/or central portions of the first layer 1 and the second layer 2 can be sealed/coupled together (e.g., by welding as discussed herein) to defined the first and second layers 1, 2. A lining layer 3 can be disposed on an outer side of one or both of the first layer 1 and the second layer 2. In various embodiments, the lining layer 3 can comprise, consist essentially of or consist of a flocking layer. In some embodiments, a flocking layer can be manufactured in various suitable ways and have various suitable characteristics, including the examples discussed herein.

In some embodiments, the first layer 1 comprises, consists essentially of or consists of a flocked planar sheet ranging from 0.5 mm-0.7 mm in thickness. In one preferred embodiment, the thickness of the flocking portion is 0.2 mm and the thickness of the sheet portion (e.g., PVC sheet) is 0.4 mm.

In some embodiments, a flocked planar sheet can have a thickness of 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, or the like, or a range between such example values.

In some embodiments, a flocked portion of the first layer 1 can have a thickness of 0.1 mm, 0.12 mm, 0.14 mm, 0.16 mm, 0.18 mm, 0.2 mm, 0.22 mm, 0.24 mm, 0.26 mm, 0.28 mm, 0.3 mm, or the like, or a range between such example values. In various examples, the thickness of the flocked portion can be defined by the thickness of flocking material coupled to a sheet portion of the first layer 1 while the flocking material is generally lying flat against the face of the sheet portion of the first layer 1.

In some embodiments, a sheet portion of the first layer 1 can have a thickness of 0.05 mm, 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, or the like, or a range between such example values. In some embodiments, the sheet portion of the first layer 1 comprises, consists essentially of or consists of PVC. In one preferred embodiment, the thickness of the first layer 1 can be a total of 0.6 mm with 0.2 mm of a sheet portion (e.g., PVC) and 0.4 mm of a flocking portion.

It should be clear that in various embodiments the novel thicknesses or ranges of thicknesses of the first layer 1, the flocked portion of the first layer 1 and the sheet portion of the first layer 1 are specifically selected to provide an optimum durability, comfort and weight of the alternating pressure pad 100 and are not simply an obvious design choice or optimization. For example, the novel thicknesses or ranges of thicknesses of the first layer 1, the flocked portion of the first layer 1 and the sheet portion of the first layer 1 can be specifically selected to have at least a minimum thickness to provide suitable durability for use as an alternating pressure pad 100 for a bedridden human adult patient that will be laying on the alternating pressure pad 100 for an extended period of time such as days, weeks, months or years. However, the novel thicknesses or ranges of thicknesses of the first layer 1, the flocked portion of the first layer 1 and the sheet portion of the first layer 1 can be specifically selected to have a thickness that is no greater than necessary so as to minimize weight of the alternating pressure pad 100, provide suitable flexibility of the alternating pressure pad 100, and to provide for suitable manufacturing as discussed herein.

For example, in one embodiment, using a flocked or non-flocked PVC sheet that is greater than or equal to 0.60 mm for one or both sides of the alternating pressure pad 100 would be cost-prohibitive due to the weight of the product (e.g., shipping costs increase as do the costs of the material). Accordingly, arguing that novel thicknesses or ranges of thicknesses discussed herein are obvious design choices or obvious optimizations would be impermissibly relying on hindsight reasoning in view of the present disclosure.

In one preferred embodiment, the first and/or second layers 1, 2 can have a puncture resistance of less than 39 lbf and greater than 18.5 lbf. In some examples, such a range can provide a desirable balance between durability and weight for the application of providing a flocked alternating pressure pad for bedsore prevention.

In some embodiments, the first and/or second layers 1, 2 can have a puncture resistance of less than 26 lbf, 27 lbf, 28 lbf, 29 lbf, 30 lbf, 31 lbf, 32 lbf, 33 lbf, 34 lbf, 35 lbf, 36 lbf, 37 lbf, 38 lbf, 39 lbf, 40 lbf, 41 lbf, 42 lbf, or the like or a range between such example values.

In some embodiments, the first and/or second layers 1, 2 can have a puncture resistance of greater than 16 lbf, 17 lbf, 18 lbf, 19 lbf, 20 lbf, 21 lbf, 22 lbf, 23 lbf, 24 lbf, 25 lbf, 26 lbf, 27 lbf, 28 lbf, 29 lbf, or the like or a range between such example values.

In one preferred embodiment, a flocked first layer 1 can have a puncture resistance of between 29 lbf and 32 lbf and a non-flocked second layer 2 can have a puncture resistance of between 24 lbf and 26 lbf.

In some embodiments, a flocked first layer 1 can have a puncture resistance of 25 lbf, 26 lbf, 27 lbf, 28 lbf, 29 lbf, 30 lbf, 31 lbf, 32 lbf, 33 lbf, 34 lbf, 35 lbf, 36 lbf, 37 lbf, or the like or a range between such example values.

In some embodiments, a non-flocked second layer 2 can have a puncture resistance of 19 lbf, 20 lbf, 21 lbf, 22 lbf, 23 lbf, 24 lbf, 25 lbf, 26 lbf, 27 lbf, 28 lbf, 29 lbf, 30 lbf, 31 lbf, or the like or a range between such example values.

In some embodiments, the second layer 2 comprises, consists essentially of or consists of a planar sheet ranging from 0.29-0.40 mm in thickness. In one preferred embodiment, the second layer 2 has a thickness of 0.35 mm. In some embodiments, a sheet portion of the first layer 2 can have a thickness of 0.05 mm, 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, or the like, or a range between such example values. In some embodiments, the second layer 2 comprises, consists essentially of or consists of PVC.

The alternating pressure pad 100 can define two independent and staggered chambers 110 based at least on one or more couplings 115 between the first layer 1 and the second layer 2. Each chamber 110 can be equipped with a separate inflation port, which can provide for different air pressures/volumes to be generated in the different chambers 110 and allowing for alternating pressure in the respective chambers 110. For example, a generated difference in air pressure between the two chambers 110 can result in differences in the height of the top surfaces of the two chambers 110 opposing bottom surfaces that engage a bed or other surface that the alternating pressure pad 100 is disposed on. By alternating the height of the chambers 110 the portions of the alternating pressure pad 100 that contact the patient can be varied or the pressure on different portions of the patient's body can be varied based on the changing height of the chambers 110. Such configurations can include first chamber 110A being high and second chamber 110B being low; first chamber 110A being low and second chamber 110B being high; both first and second chambers 110 being low; and both first and second chambers 110 being high. Varied pressure and contact on the body of the patient through inflation and/or deflation of the chambers 110 can be desirable for preventing bedsores and expediting healing of existing bedsores where present. In various embodiments, the lining layer 3 (e.g., flocking layer) can make the alternating pressure pad 100 more comfortable and softer for the user, prevent slipping on the alternating pressure pad 100, provide for heat and/or moisture control, and the like.

In some embodiments, the alternating pressure pad 100 includes a first layer 1 and a second layer 2, wherein the second layer 2 is connected to the first layer 1 at the outer edge. In some embodiments, the one or more couplings 115 between the first and second layers can be a direct coupling between the first and second layers 1, 2 (e.g., via welding, an adhesive or the like).

However, in some embodiments, the first and second layers 1, 2 can be separated by a partition 4 (see e.g., FIGS. 4 and 5) that couples the first and second layers 1, 2 and defines the first chamber 110A and the second chamber 110B. For example, in various embodiments such a partition 4 can be a planar sheet comprising the same material(s) as one or both of the first and second layers 1, 2 with the partition 4 being coupled to the first and second layers 1, 2 in various suitable ways such as via welding, an adhesive, or the like.

In various embodiments, the first chamber 110A can be inflated and/or deflated via a first air charging port 6, that can be coupled to the first or second layer 1, 2 to define a passage through which air (or other suitable fluid) can be introduced into the first chamber 110A. In various embodiments, the second chamber 110B can be inflated and/or deflated via a second air charging port 7, that can be coupled to the first or second layer 1, 2 to define a passage through which air (or other suitable fluid) can be introduced into the second chamber 110B.

Figure 3:
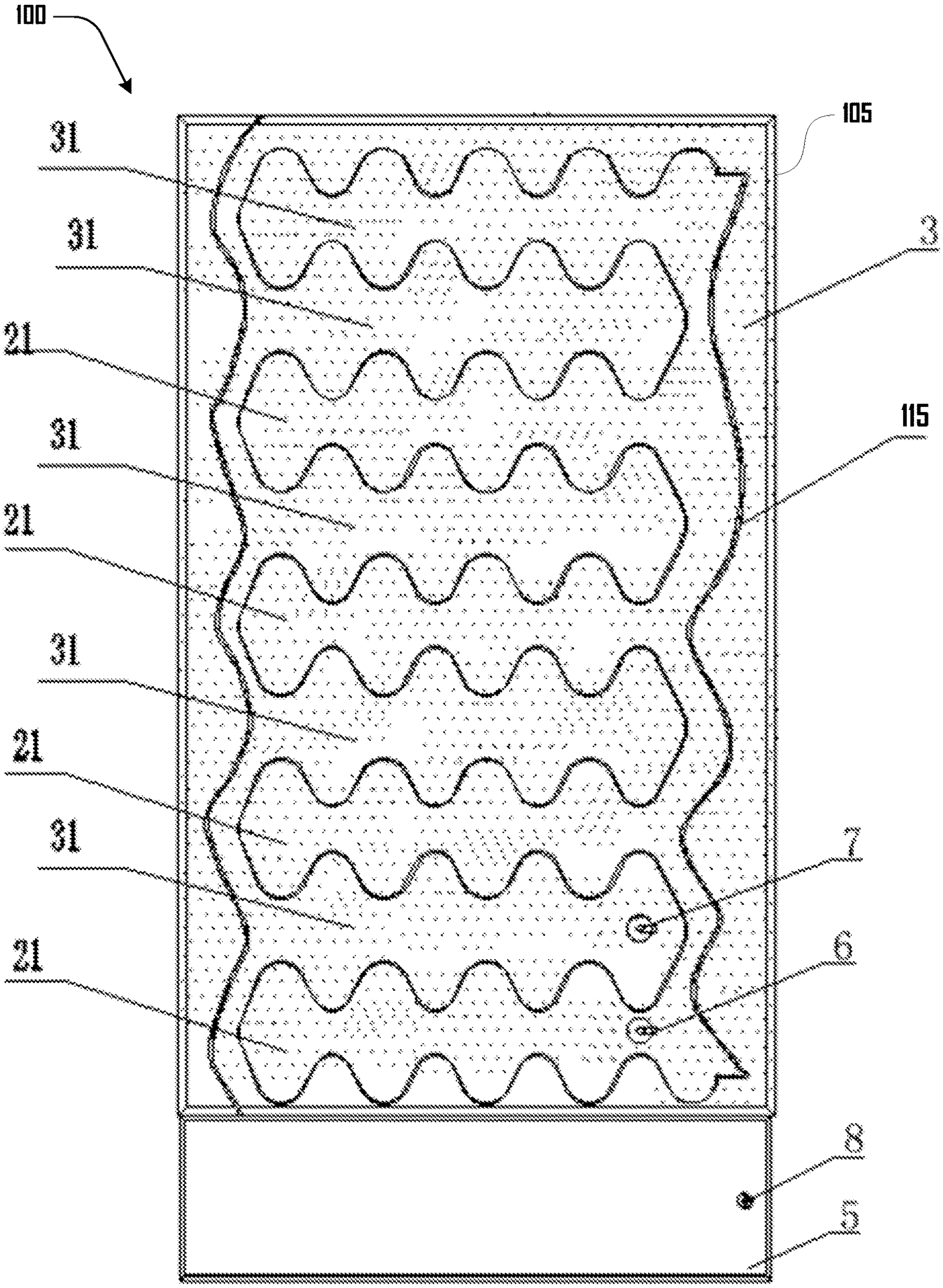
FIG. 3 is an example front view illustrating an embodiment of alternating pressure pad.
Figure 4:
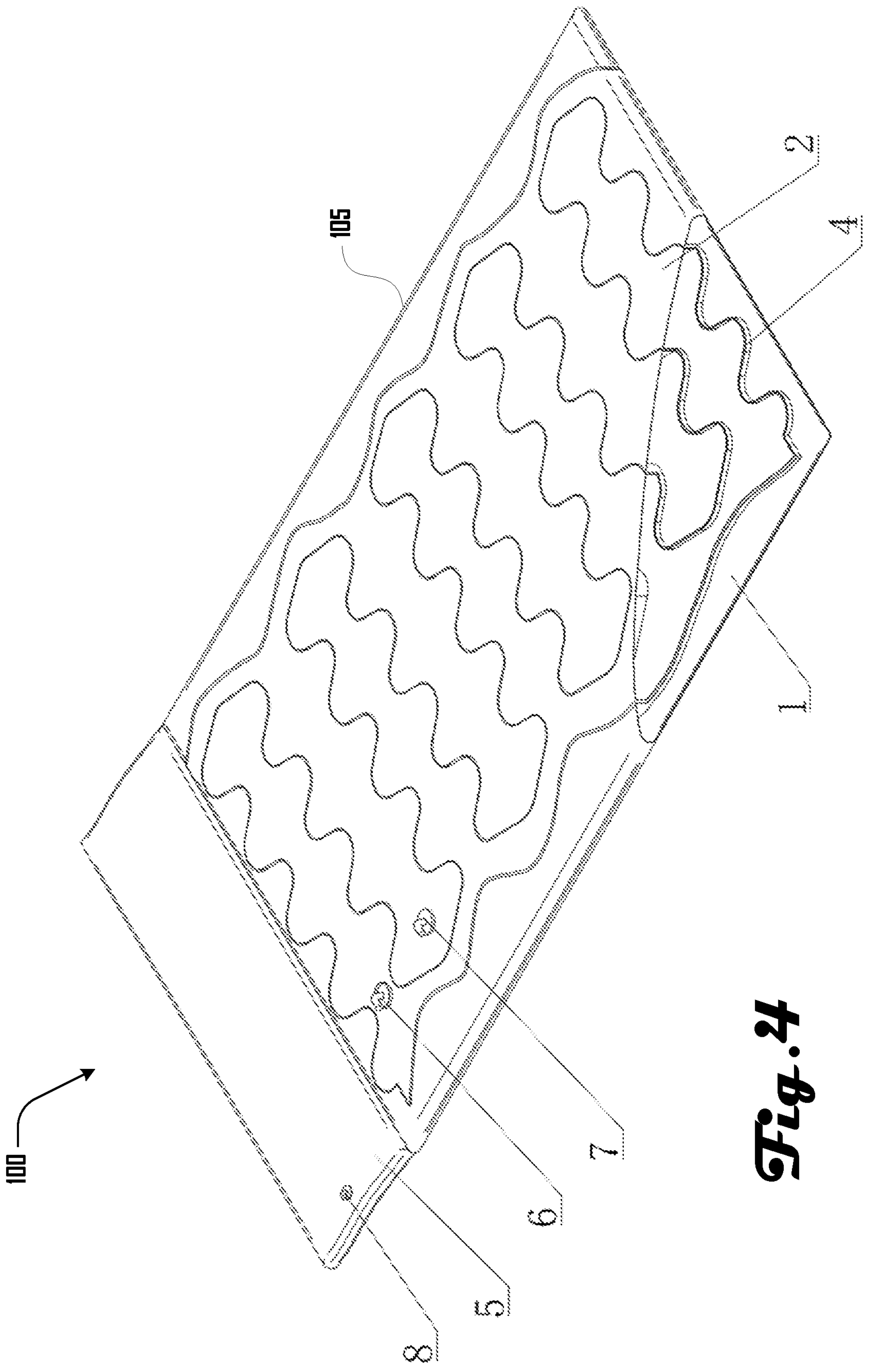
FIG. 4 is an example cut-away perspective view illustrating an embodiment of alternating pressure pad.
Figure 5:
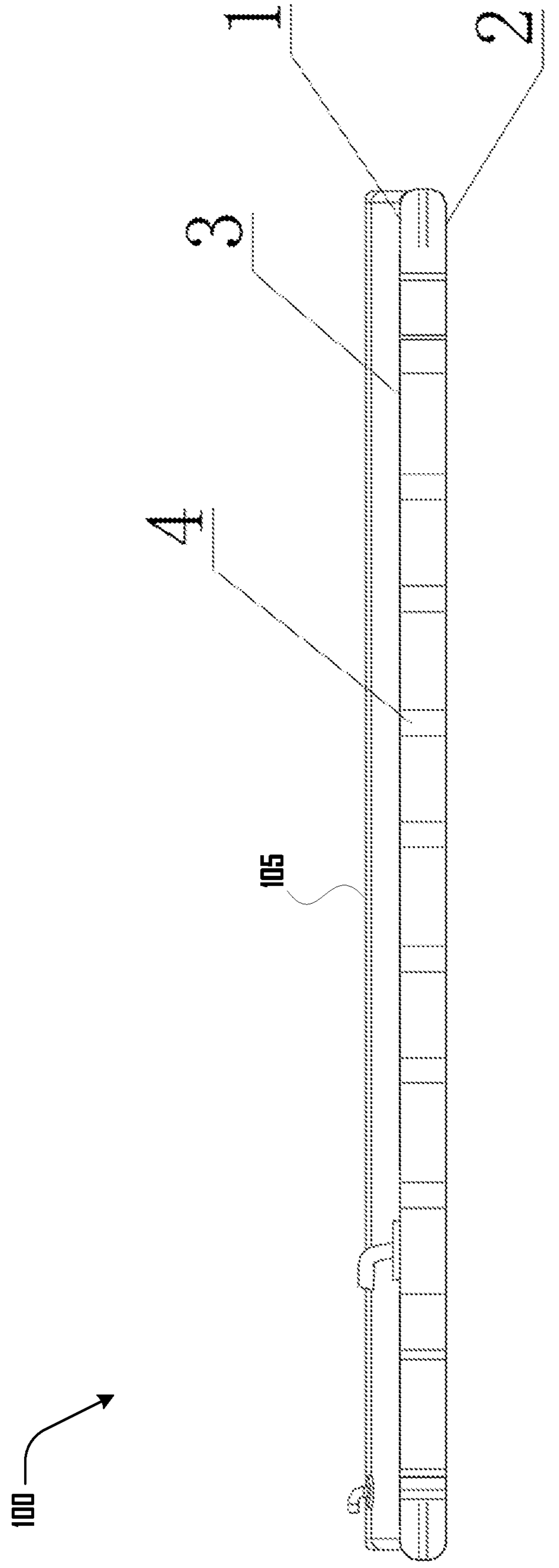
FIG. 5 is an example side view illustrating an embodiment of alternating pressure pad.

In various embodiments, the first and second chambers 110A, 110B can respectively define a plurality of first forks 21 and second forks 31 (see e.g., FIG. 3). Such first and second forks 21, 31 can be staggered and have a central axis that is parallel to a width axis of the alternating pressure pad 100 and perpendicular to a length axis of the alternating pressure pad 100.

Such a staggered chamber configuration can be desirable to provide support along the length of the body of a patient laying on the alternating pressure pad 100 (e.g., with the transverse axis of the patient generally along the length axis of the alternating pressure pad 100), even if one of the first and second chambers 110A, 110B is deflated due to alternating inflation or structural failure of a chamber 110.

In various embodiments, the alternating pressure pad 100 can comprise an extension member 5, which in some examples increases the overall length of the alternating pressure pad 100. The extension member 5 in some examples can be configured to increase the coverage area of the alternating pressure pad 100, provide for a head or foot rest for a user, facilitate fixation of the alternating pressure pad 100 (e.g., to a bed, mattress or other surface or object that the alternating pressure pad 100 is disposed on).

In various embodiments, the extension member 5 can comprise an inflation port 8 that can be used to inflate and/or deflate the extension member. Accordingly, in some embodiments the extension member 5 cavity that can be filled with air or other suitable fluid. In some embodiments, the extension member 5 can be a solid component without such an inflatable cavity. In various embodiments, the extension member 5 can be defined by one or more planar sheets (e.g., PVC, flocked PVC, or the like).

The thickness of the extension member 5 in one preferred embodiment can be 0.18 mm. In some embodiments, the extension member 5 can have a thickness of 0.05 mm, 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, or the like, or a range between such example values. In some embodiments, extension member 5 comprises, consists essentially of or consists of PVC.

Also, while various examples herein illustrate a single extension member 5 extending from one end of the length of the alternating pressure pad 100, further embodiments can include any suitable plurality of extension members 5 including extension members 5 extending from opposing sides of the length of the alternating pressure pad 100, one or more extension members 5 extending from one or both sides of the width edges of the alternating pressure pad 100, or the like.

Figure 6:
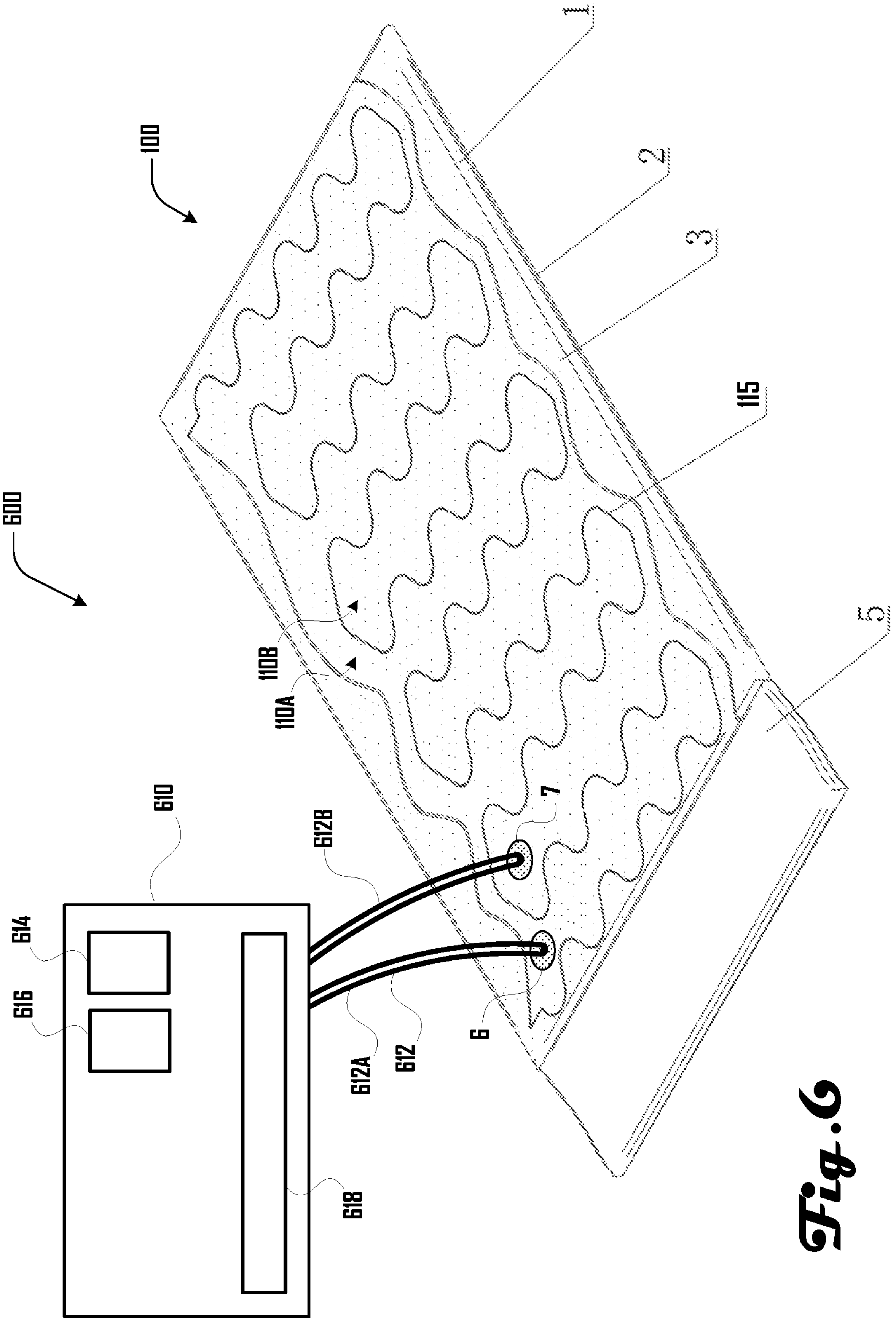
FIG. 6 is an example diagram illustrating an embodiment of alternating pressure pad system.

Turning to FIG. 6, an example of and alternating pressure pad system 600 is illustrated that comprises an alternating pressure pad 100 and a pump system 610. As shown in this example embodiment, the pump system comprises a first tube 612A and second tube 612B that are respectively coupled with a first port 6 and second port 7. In various embodiments, the pump system 610 can be configured to separately inflate and/or deflate first and second chambers 110A, 110B of the alternating pressure pad 100 by introducing and/or removing air (or other suitable fluid) from the first and second chambers 110A, 110B via the first and second tubes 612A, 612B and first and second ports 6, 7 that communicate with the first and second chambers 110A, 110B.

In various embodiments, the pump system 610 can be a suitable electronic or computing device, which can include elements like a processor, memory and the like. The pump system 610 can comprise a computer readable medium (e.g., memory) that stores instructions that when executed cause the pump system 610 to perform various functions including an automated alternating pressure routine that can include alternatingly inflating and deflating the first and second chambers 110A, 110B as discussed herein. Such a routine can alternatingly inflate and deflate the first and second chambers 110A, 110B in a looping cycle in various examples.

In some embodiments, the pump system 610 can comprise an interface that comprises a power switch 614, a routine selection switch 616, and a pressure slider 618. In various examples, the power switch 614 can power or de-power the pump system 610, with power supplied to the pump system 610 in various suitable ways including via plugging into a wall receptacle, a battery, or the like. In various examples, the routine selection switch 616 can allow for selection between a static inflation state or an automated alternating pressure routine as discussed herein. In various examples, the pressure slider 618 can allow a user to select a firmness setting of the alternating pressure pad 100, which can include a firmness for a static pressure mode, a maximum pressure for the chambers 110 during an alternating pressure routine, or the like. Additionally, in various embodiments, the pump system 610 can comprise other suitable components such as one or more pumps, one or more valves, a touchscreen, a wired or wireless communication device (e.g., that allows communication with a local device such as a smartphone or remote devices via the Internet, or the like). In some embodiments, the pump system 610 can be configured to inflate and/or deflate one or more extension members 5.

An alternating pressure pad 100 can be manufactured in various suitable ways. For example, sheets for first and second layers 1, 2 can be provided (e.g., flocked and/or non-flocked planar PVC sheets) and the first and second layers 1, 2 can be coupled together in various suitable ways with one preferred embodiment including high-frequency welding. Further embodiments can include any suitable welding or coupling method including heat sealing, radio frequency (RF) welding, ultrasonic welding, solvent bonding, hot gas welding, an adhesive, a tape, mechanical fastening, and the like.

In one preferred embodiment, a hydraulic press uses 30 kg of pressure to press the first and second layers 1, 2 together while a 9 amp current melts and couples the first and second layers 1, 2 in about 2.3 seconds. In some embodiments, a welding current can be between 6-13 amps; hydraulic pressure can be between 20-40 kg; and welding time can be between 1-5 seconds. In various embodiments, a flocked portion of a layer 1,2 can have a thickness of 0.01 mm-1.0 mm; a sheet portion of a layer 1, 2 can have a thickness of 0.01 mm-1.0 mm (e.g., a PVC sheet); and a total thickness of a layer 1, 2 can be between 0.01-2.0 mm.

The novel thicknesses or ranges of thicknesses of the first layer 1, the flocked portion of the first layer 1 and the sheet portion of the first layer 1 can be specifically selected to have a thickness that is no greater than necessary so as to minimize weight of the alternating pressure pad 100, provide suitable flexibility of the alternating pressure pad 100, and to provide for desired manufacturing within parameters discussed herein. Accordingly, arguing that such novel thicknesses or ranges of thicknesses are obvious design choices or obvious optimizations would be impermissibly relying on hindsight reasoning in view of the present disclosure.

Embodiments of the disclosure can be described in view of the following clauses:

1. A multi chamber inflatable mattress, characterized in that the multi chamber inflatable mattress comprises:

The first layer; and

The second layer is connected to the first layer at the outer edge;

The first and second layers are defined by a partition part to define a first cavity and a second cavity that are spaced apart from each other, and the first cavity is connected to the first inflation port, and the second cavity is connected to the second inflation port; and The first chamber has multiple first forks, the second chamber has multiple second forks, and the multiple first forks are arranged in a staggered manner with the multiple second forks.

2. The multi chamber inflatable mattress according to claim 1, characterized in that the multi chamber inflatable mattress comprises a lining layer arranged at the edge of the first layer, wherein the contour of the lining layer is complementary to the contours of the first chamber and the second chamber.

3. The multi chamber inflatable mattress according to claim 2, characterized in that the lining layer is a flocking layer.

4. The multi chamber inflatable mattress according to claim 1, characterized in that the multi chamber inflatable mattress further includes an extension connected to the ends of the first layer and the second layer.

5. The multi chamber inflatable mattress according to claim 4, characterized in that the extension portion has a third inflation port.

6. The multi chamber inflatable mattress according to claim 4, characterized in that the extension part is a solid component.

7. The multi chamber inflatable mattress according to claim 1, characterized in that the contour between the first fork and the adjacent second fork is a linear separating part.

8. The multi chamber inflatable mattress according to claim 1, characterized in that the contour between the first fork and the adjacent second fork is a curved dividing part.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

EXAMPLES

Puncture tests were performed on different flocked and non-flocked PVC sheets of different thicknesses. The following procedure was followed for each of the tests:

(1) Cut a piece of specimen from the sample sized to fit into the serrated clamping plate with an open area 6" diameter (~15.24 cm); (2) Clamp the specimen on the serrated clamping plate; (3) Set a force gage and a ¼" (~0.635 cm) diameter steel rod for puncture; (4) Push the steel rod into the specimen at a constant rate 1 inch/minute (~2.54 cm/min.); (5) Measure the force used to puncture through the specimen in lbf (lbf=pound-force, which is approximately equal to 4.44822 newtons); (6) Observe and record all findings or any other unusual changes; and (7) Repeat steps 1 to 5 for other specimen(s) if necessary.

A test on a flocked PVC sheet having a thickness of 0.6 mm (with 0.2 mm of a PVC sheet portion and 0.4 mm of a flocking portion) yielded the following results: Specimen #1: 31.3 lbf; Specimen #2: 29.8 lbf; Specimen #3: 30.2 lbf; Specimen #4: 30.4 lbf; Specimen #5: 30.5 lbf.

A test on a non-flocked PVC sheet having a thickness of 0.35 mm yielded the following results: Specimen #1: 25.2 lbf; Specimen #2: 26.0 lbf; Specimen #3: 24.6 lbf; Specimen #4: 25.4 lbf; Specimen #5: 25.3 lbf.

An alternating pressure pad 100 comprising first and second layer 1, 2 of the tested flocked PVC sheet having a thickness of 0.6 mm (with 0.2 mm of a PVC sheet portion and 0.4 mm of a flocking portion) and a non-flocked PVC sheet having a thickness of 0.35 mm was found to be desirable for the application of providing a flocked alternating pressure pad for bedsore prevention.

A test on a non-flocked PVC sheet having a thickness of 0.559 mm yielded the following results: Specimen #1: 40.6 lbf; Specimen #2: 39.8 lbf; Specimen #3: 39.3 lbf; Specimen #4: 39.5 lbf; Specimen #5: 39.8 lbf.

A test on a non-flocked PVC sheet having a thickness of 0.28 mm yielded the following results: Specimen #1: 17.5 lbf; Specimen #2: 17.8 lbf; Specimen #3: 17.9 lbf; Specimen #4: 17.3 lbf; Specimen #5: 18.3 lbf.

What is claimed is:

1. An alternating pressure pad system for bedsore prevention, the alternating pressure pad system comprising:

an alternating pressure pad having a rectangular shape with a length axis that is greater than a width axis, the alternating pressure pad comprising:

a first layer defined by a planer sheet of flocked polyvinyl chloride (PVC), the first layer having a thickness of between 0.50 mm-0.70 mm and consisting essentially of a PVC portion and a flocked portion coupled to a face of the PVC portion, the PVC portion having a thickness of between 0.3 mm and 0.5 mm and the flocked portion having a thickness between 0.15 mm and 0.25 mm, the first layer having a puncture resistance of between 29 lbf and 32 lbf;

a second layer defined by a planer sheet of non-flocked PVC, the second layer having a thickness between 0.29-0.40 mm a puncture resistance of between 24 lbf and 26 lbf, the second layer consisting essentially of only of PVC and being directly physically coupled with the first layer via a plurality of weld couplings;

a first chamber and a second chamber that is separate from the first chamber, the first and second chambers being defined by the first and second layers and the plurality of weld couplings that physically couple the first and second layers, the first and second chambers being physically separate such that the first and second chambers can be separately inflated and deflated, the first and second chambers defining a plurality of first and second forks that are staggered with each other, with each of the plurality of first and second forks having a central fork axis that is parallel to the width axis of the alternating pressure pad and perpendicular to the length axis of the alternating pressure pad; and a first charging port and a second charging port, the first charging port defining a passage through which air can be introduced into the first chamber and the second charging port defining a passage through which air can be introduced into the second chamber, the first charging port and the second charging port being separate such that the first and second chambers can be separately inflated and deflated via the first charging port and the second charging port; and a pump system comprising a first tube and a second tube that are respectively coupled with the first charging port and the second charging port, the pump system configured to separately inflate and deflate the first and second chambers of the alternating pressure pad by introducing and removing air from the first and second chambers via the first and second tubes and first and second charging ports that communicate with the separate first and second chambers, the pump system being an electronic device comprising a processor and a memory that stores instructions that when executed by the processor cause the pump system to perform an automated alternating pressure routine that includes alternatingly inflating and deflating the first and second chambers in a looping cycle.

2. The alternating pressure pad system of claim 1, wherein the alternating pressure pad comprises a first and second extension member that respectively extend from opposing side ends of the length of the alternating pressure pad, the first and second extension members being solid components without an inflatable cavity and configured to facilitate fixation of the alternating pressure pad to a bed or mattress by tucking the first and second extension members under or into the bed or mattress.

3. The alternating pressure pad system of claim 1, wherein the planer sheet of flocked Polyvinyl Chloride (PVC) of the first layer is configured to make the alternating pressure pad more comfortable and softer for a patient resting on the alternating pressure pad, reduce slipping of the patient on the alternating pressure pad, and provide for heat and moisture control for the patient when resting on the alternating pressure pad.

4. The alternating pressure pad system of claim 1, wherein the alternating pressure pad is configured for use by bedridden patients resting on alternating pressure pad for long periods of time including for multiple days, weeks or months.

5. An alternating pressure pad system for bedsore prevention, the alternating pressure pad system comprising:

an alternating pressure pad having a rectangular shape with a length axis that is greater than a width axis, the alternating pressure pad comprising:

a first layer defined by a planer sheet of flocked polyvinyl chloride (PVC), the first layer having a thickness of between 0.50 mm-0.70 mm and consisting essentially of a PVC portion and a flocked portion coupled to a face of the PVC portion, the PVC portion having a thickness of between 0.3 mm and 0.5 mm and the flocked portion having a thickness between 0.15 mm and 0.25 mm, the first layer having a puncture resistance of between 29 lbf and 32 lbf;

a second layer defined by a planer sheet of non-flocked PVC, the second layer having a thickness between 0.29-0.40 mm a puncture resistance of between 24 lbf and 26 lbf, the second layer consisting essentially of only of PVC and being directly physically coupled with the first layer via a plurality of weld couplings; and a first chamber and a second chamber that is separate from the first chamber, the first and second chambers being defined by the first and second layers and the plurality of weld couplings that physically couple the first and second layers, the first and second chambers being physically separate such that the first and second chambers can be separately inflated and deflated.

6. The alternating pressure pad system of claim 5, further comprising a pump system that includes a first tube and a second tube that are respectively coupled with a first charging port and a second charging port, the pump system configured to separately inflate and deflate the first and second chambers of the alternating pressure pad by introducing and removing air from the first and second chambers via the first and second tubes and first and second charging ports that communicate with the separate first and second chambers, the pump system being an electronic device comprising a processor and a memory that stores instructions that when executed by the processor cause the pump system to perform an automated alternating pressure routine that includes alternatingly inflating and deflating the first and second chambers in a looping cycle.

7. The alternating pressure pad system of claim 5, wherein the alternating pressure pad further comprises a first charging port and a second charging port, the first charging port defining a passage through which air can be introduced into the first chamber and the second charging port defining a passage through which air can be introduced into the second chamber, the first charging port and the second charging port being separate such that the first and second chambers can be separately inflated and deflated via the first charging port and the second charging port.

8. The alternating pressure pad system of claim 5, wherein the first and second chambers define a plurality of first and second forks that are staggered with each other, with each of the plurality of first and second forks having a central fork axis that is parallel to the width axis of the alternating pressure pad and perpendicular to the length axis of the alternating pressure pad.

9. An alternating pressure pad system, the alternating pressure pad system comprising:

an alternating pressure pad that includes:

a first layer defined by a planer sheet of flocked polyvinyl chloride (PVC), the first layer having a thickness of between 0.50 mm-0.70 mm and comprising a PVC portion and a flocked portion coupled to a face of the PVC portion, the PVC portion having a thickness of between 0.3 mm and 0.5 mm and the flocked portion having a thickness between 0.15 mm and 0.25 mm.

10. The alternating pressure pad system of claim 9, wherein the alternating pressure pad has a rectangular shape with a length that is greater than a width.

11. The alternating pressure pad system of claim 9, wherein the first layer consists essentially of a PVC portion and a flocked portion coupled to a face of the PVC portion.

12. The alternating pressure pad system of claim 9, wherein the first layer has a puncture resistance of between 29 lbf and 32 lbf.

13. The alternating pressure pad system of claim 9, wherein the alternating pressure pad comprises a second layer defined by a planer sheet of non-flocked PVC, the second layer having a thickness between 0.29-0.40 mm.

14. The alternating pressure pad system of claim 13, wherein the second layer has a puncture resistance of between 24 lbf and 26 lbf.

15. The alternating pressure pad system of claim 13, wherein the second layer consists essentially of only of PVC.

16. The alternating pressure pad system of claim 13, wherein the second layer is directly physically coupled with the first layer via one or more weld couplings.

17. The alternating pressure pad system of claim 13, wherein the alternating pressure pad further comprises a first chamber and a second chamber that is separate from the first chamber, the first and second chambers being defined by the first and second layers and one or more weld couplings that physically couple the first and second layers.

18. The alternating pressure pad system of claim 17, wherein the first and second chambers are physically separate such that the first and second chambers can be separately inflated and deflated.

* * * * *